Patented Jan. 26, 1932

1,842,696

UNITED STATES PATENT OFFICE

HENRY B. SLATER, OF RIVERSIDE, CALIFORNIA, ASSIGNOR TO FOOD MACHINERY CORPORATION, OF SAN JOSE, CALIFORNIA, A CORPORATION OF DELAWARE

PROCESS OF PREPARING DISINFECTED FRUIT

No Drawing. Continuation of application Serial No. 538,360, filed February 21, 1922. This application filed September 12, 1930. Serial No. 481,582.

This application is a continuation of my co-pending application Serial No. 538,360, filed February 21, 1922.

It is well known that most of the fruits and vegetables grown in the open are infected with putrefactive bacteria and similar organisms which cause decay and much loss is occasioned thereby, so that, because of this supposedly necessary loss, the cost of that which is wholesome and usable is increased to the consumer, beyond what it would be if such conditions could be eliminated.

Among the organisms causing immense losses in the shipping of citrus fruits and some other kinds of fruits, certain molds are known to be particularly destructive. The blue mold and the green mold cause immense losses in the shipment of oranges. The term "bacteria" above referred to is intended to embrace all such organisms.

It is the object of this invention to reduce this waste and loss by prevention of this putrefactive decay and preserve the products of orchard and farm. Fruits and vegetables, if properly disinfected and then preserved from septic conditions, will last and keep their freshness much longer if treated by the process of this invention. Apples, pears, plums, grapes, oranges, lemons and other fruits, as well as tomatoes, potatoes, onions, turnips, etc., can all be treated by this process, as it is not only disinfectant but quite harmless and adds no unpleasant taste to the goods treated. Fruits that lose their moisture content will be well preserved in that respect, and oranges especially will keep their appearance and will be preserved during the long journey from the point of shipment to that of ultimate consumption, be the journey by rail or water, much better than in the untreated condition.

For such fruits as the orange, a covering of some sort is sometimes useful, and I propose (when desirable) to cover the orange, lemon, tangerine, etc., with a coating of a soft wax-like nature, which while protecting it from infection will also preserve the moisture content of the fruit.

In the orange-growing districts of California and elsewhere, every precaution is taken to start the fruit on its journey to the consumer as clean and aseptic as is known how, and yet the loss from decay in transport is large. The loss is considerable as it includes the cost of picking, packing, and the freight (on the spoiled fruit) to say nothing of the value of the fruit itself. The loss from decay has already been considerably reduced, but this loss still cuts into the profits of a shipment to an undesired extent, and the loss is still a heavy tax upon the industry.

The orange grows upon a tree in a grove nearly always infected with the bacteria of putrefaction. It is true that the fumigation practiced will partially disinfect the trees, but the ground is usually perpetually infected and the trees and fruit must be so.

Obviously, the oranges are picked by infected hands, placed in an infected bag, and poured into an infected field box, placed upon an infected wagon and taken to an infected packing house where it is handled by infected machinery and finally wrapped and boxed by infected hands sometimes covered by more infected gloves. It is accordingly, not surprising that there is much loss from decay in transport.

Various processes have been proposed for the preservation of oranges and the prevention of decay, none of which has, thus far, been wholly successful. Treatment with asphyxiating gas, solution of copper sulfate, etc., have been tried, but with little success. In all of these processes the fruit has been subjected to infection after disinfection and before packing in spite of the acknowledged fact that the packing house and all that is in it is infected with the bacteria of decomposition. It follows that a process that disinfects the fruit with even the most powerful disinfectants, such as formaldehyde, hydrocyanic acid, or chlorine gas, and then subjects it to the very necessary washing, also leaves the fruit subject to the very obvious septic conditions existing all about. For the disinfection by such means must of necessity be conducted in a separate apartment, hermetically sealed, and all traces of the gas must be removed from the apartment by suitable means, before the operators can handle the fruit and before the fruit can be brought into the room with living human beings.

Of course, as soon as the disinfection is complete and the fruit removed from that cycle of operations the fruit becomes exposed to the surrounding conditions, and because of the cleansing effect of the disinfection its surface is more receptive and more susceptible to infection than before, and so the after-washing and coating with wax or what not, may enclose anaerobic bacteria, that, under the protection of the film of wax, will develop a greater and better advantage than otherwise. That is to say, the coating, excluding all air, is to the advantage of this class of bacteria, and to that extent the coating is a disadvantage to the preservation of the fruit.

The essence of my invention is the disinfection of the fruit with a non-poisonous disinfectant, and for this purpose I use hypochlorite of sodium, produced electrolytically and brought into contact with the fruit while warm, because the germicidal activity of the disinfectant is greater when warm, its reaction velocity being increased and the disinfectant made effective in a shorter time than when using a cold solution.

A solution containing sodium hypochlorite (of which available chlorin in the essential active constituent is especially suitable,) as this active chlorin destroys not only bacteria but also the spores of the molds which are likely to infect fruits. In the case of citrus fruits especially, the blue or green molds are especially destructive, causing spoilage of immense amounts of fruit, during and after transportation to the market.

In order to preserve the fruit from later infection and to protect its moisture content, I also preferably cause the fruit to pass, directly from the hypochlorite bath, upward through a solution of a wax dissolved in a vehicle that is non-miscible with the solution, said wax solution floating upon the surface of the disinfectant bath and there kept in contact with the disinfectant so that the fruit must pass upward through both the disinfectant and the wax solution without coming into contact with infected matter or things. The solution of wax will completely cover and enclose the fruit and is assisted therein by the slightly alkaline sodium hypochlorite. The coating will be infinitesimally thin but complete and unbroken.

Hypochlorite of sodium is one of the very best disinfectants known to science, its germicidal action being greater than that of carbolic acid in solutions of similar strength. It has been found and published that the germicidal action of sodium hypochlorite (NaOCl) in a concentration of 1:20,000 is as active as a 1% solution of carbolic acid. A solution of NaOCl=0.5% and in a mixture reducing it to 0.17%, reduced the bacterial count in solution from 1,966,000 to 0 in five minutes. And yet a solution of this strength can be used as a mouth wash or gargle.

In the preferred mode of carrying out the process of my present invention, I provide an electrolytic cell in which sodium chloride brine is subjected to electrolysis with the production of sodium hypochlorite in solution. This sodium hypochlorite solution ordinarily leaves the electrolyzer in a somewhat warm condition and it is advisable to maintain the same warmth during the treatment of the fruit, such as oranges, therewith. The sodium hypochlorite solution preferably runs continuously into a bath in which the fruit is to be treated, this bath preferably being maintained in a tank having a baffle across the same, at the upper part of the solution, and in one side or section of the bath there is preferably maintained on the surface of the solution a thin layer of molten paraffin wax, or preferably a thin layer of a mixture of a paraffin wax and kerosene or other oil, preferably an oil of the petroleum type. This mixture of paraffin wax and oil is hereinafter referred to as a "waxy material". The liquor from this tank may then overflow into a preliminary washing tank if desired, and the water from this preliminary washing tank may be filtered and then pumped back to the electrolytic cell for regeneration. In ordinary practice it is preferred to keep the solution of hypochlorite in the final treating bath at a temperature of about 35° to 40° C. The invention in its broader aspects is not restricted to a particular strength of the disinfectant bath. However, for the treatment of washed oranges of "average" quality and condition, very satisfactory results can be secured when using a solution coming from the electrolytic cell and containing, say, about 0.1% to 0.5% of sodium hypochlorite in solution (corresponding to about 0.06 to 0.33% of the hypochlorite radical). The active agent can be considered as the hypochlorous acid or the "active chlorin liberated" by the amount of hypochlorite used. While this strength of solution has been found to be very satisfactory for the treatment of oranges in what might be termed "average condition" it is to be understood that with other fruits or vegetables as herein referred to, either stronger or weaker solutions would, in some instances, be preferable thereto.

The fruit, such as oranges or the like, may first be washed in any ordinary manner or with any ordinary washing liquids. They may then be washed in the preliminary washing tank above referred to containing a solution in which there is a small amount of hypochlorite which was not completely used up by once washing fruit therein. The fruit is then carried into the principal bath of fresh hypochlorite solution of full strength, preferably entering the same on the side of the baffle where there is no film of waxy material, and the fruit is then brought upwardly through the hypochlorite solution and through the film of waxy material. In this way there is no contact of the fruit with any septic material after it leaves the disinfecting solution before it passes through the layer of waxy material. Hence, there is no opportunity for the fruit to become infected with bacteria liable to produce decay, before the fruit receives its thin sealing coat of waxy material. Machinery capable of conveying the fruit through the ordinary washing operation, then through the preliminary washing and disinfecting bath, then through the final full strength disinfecting bath and wax-sealing treatment, is of a type all well known and hence it is unnecessary to illustrate the same. In many cases it is not necessary to use all three of the liquid treatments above referred to.

It will be understood that the fruit after leaving the bath will soon dry and the paraffin mixture (waxy material) will harden to some extent, leaving the fruit ready for wrapping, if desired, and packing in the usual manner in any desired boxes, crates, or the like for shipment.

While I have above referred to the use of sodium hypochlorite as being the preferred hypochlorite to be used, the invention is not restricted thereto but is to be construed broadly as embracing the use of the hypochlorites of alkali-forming metals, namely those metals of which (like sodium) the oxids and hydroxids are commonly referred to as "alkalies".

No claim is made therein to the treatment of the fruit with a film of waxy material except in combination with the previous disinfecting treatment.

Since sodium hypochlorite solution decomposes to a large extent, the ultimate product carries sodium chlorid. In the product claims appended, the expression "hypochlorite" accordingly is to be understood as including the solid decomposition products.

The term "fruit" is used in the appended claims, in its broad sense, including the edible product of vegetable growth.

While the disinfecting bath is preferably somewhat warm (say 35-40° C.) it should not be hot enough to cook or partly cook the fruit.

In the circulation of the liquor through the electrolytic cell, main treating tank, preliminary treating tank, filter and back to the cell, additional sodium chlorid can be added, from time to time or continuously as desired, to maintain the desired concentration of the solution.

It is to be understood that the coating with a waxy material, can be omitted in some cases, in which case the fruit, after being removed from the hypochlorite solution is simply allowed to dry, and then it can be wrapped in paper or the like, if desired.

I claim:

1. A process which comprises passing substantially clean citrus fruit into a bath of a warm solution of a hypochlorite of an alkali metal, and then upwardly through a layer containing molten waxy material floating on the surface of said solution.

2. A process which comprises the step of bringing the entire exterior surface of fruit into contact with a non-poisonous disinfectant solution containing a hypochlorite of an alkali-forming metal.

3. A process which comprises the steps of bringing fruit into contact with a non-poisonous disinfectant solution containing a hypochlorite of an alkali-forming metal and then coating the fruit with a thin coating of protective material.

4. A process which comprises applying to fruit, a coating of a solution of an alkali-forming metal hypochlorite such solution being of a strength corresponding to about .06 to .33% of the hypochlorous acid radical.

5. A process which comprises applying to fruit a coating of a solution of sodium hypochlorite, such solution being of about 0.1 to 0.5% strength, and being applied at a temperature of about 35 to 40° C.

6. A process of treating citrus fruit which comprises applying thereto a thin coating of solution containing a hypochlorite of an alkali-forming metal, and thereafter applying to such fruit an extremely thin coating of a molten soft waxy material.

7. A process of treating citrus fruit which comprises passing the same through a warm solution of sodium hypochlorite of about 0.1 to 0.5% strength, and thence immediately upwardly through a layer of molten soft waxy material, floating on the surface of such hypochlorite solution.

8. The process which comprises the step of bringing citrus fruit into contact with a non-poisonous disinfectant solution containing a hypochlorite of an alkali metal.

9. A process which comprises passing citrus fruit through a bath containing a warm hypochlorite solution, and thence upwardly through a layer containing molten soft waxy material floating on the surface thereof.

10. A process which comprises the step of bringing the entire exterior surface of citrus fruit into contact with a non-poisonous disinfectant solution containing a hypochlorite of an alkali-forming metal.

11. In the preparation of fresh fruit for the market, the process which comprises subjecting fruit to the action of an alkaline liquid containing chlorine in active form.

12. In the preparation of fresh fruit for the market, the process which comprises subjecting fruit to the action of an alkaline solution containing sodium hypochlorite.

13. In the preparation of fresh fruit for the market, the process which comprises subjecting fruit to the action of an alkaline liquid containing chlorine in active form, and then providing the fruit with a very thin coating of protective material.

14. In the preparation of fresh fruit for the market, the process which comprises subjecting the fruit to the action of an alkaline liquid containing chlorine in active form, and then providing the fruit with a very thin coating film of protective material comprising paraffin.

Signed at Riverside, California, this 6th day of September, 1930.

HENRY B. SLATER.